United States Patent [19]
Bonet et al.

[11] Patent Number: 5,122,318
[45] Date of Patent: Jun. 16, 1992

[54] PROCESS FOR PRODUCING AN ATMOSPHERE FOR THE MANUFACTURE OF HIGH PERFORMING COMPOSITE ELEMENTS

[75] Inventors: Claude Bonet, Paris, France; Francois-Xavier Barbier, Hinsdale, Ill.

[73] Assignee: L'Air Liquide, Societe Anonyme pour l'Etude et l'Exploitation des Procedes Georges Claude, Paris, France

[21] Appl. No.: 478,538

[22] Filed: Feb. 12, 1990

[30] Foreign Application Priority Data

Feb. 14, 1989 [FR] France .................. 89 01867

[51] Int. Cl.$^5$ .................. B29C 43/20; B29C 43/56
[52] U.S. Cl. .................. 264/85; 264/511; 264/546; 264/553; 264/571; 264/258; 425/389
[58] Field of Search .................. 264/85, 257, 500, 546, 264/552, 553, 571, DIG. 50, 511, 258; 425/388, 389, 405.1, 324.1

[56] References Cited

U.S. PATENT DOCUMENTS

| | | | |
|---|---|---|---|
| 4,254,070 | 3/1981 | Yodogawa et al. | 264/85 |
| 4,255,371 | 3/1981 | Shimoyashiki et al. | 264/85 |
| 4,348,213 | 9/1982 | Armond | 55/58 |
| 4,382,052 | 5/1983 | Arimatsu | 264/85 |
| 4,494,966 | 1/1985 | Umeki | 55/58 |
| 4,560,523 | 12/1985 | Plumley et al. | 425/389 |
| 4,681,718 | 7/1987 | Oldham | 264/500 |
| 4,986,870 | 1/1991 | Frohlich | 156/382 |

OTHER PUBLICATIONS

"Development of a Pilot Autoclave for Polymeric Diaphragm Forming of Continuous Fibre-Reinforced Thermoplastics", Composites, vol. 19, No. 1, Jan. 1988, By P. Mallon et al, pp.3 7-47.

Primary Examiner—Jay H. Woo
Assistant Examiner—James Mackey
Attorney, Agent, or Firm—Young & Thompson

[57] ABSTRACT

Process for producing an atmosphere for the manufacture of high performance composite parts, of the type wherein the atmosphere is used in an autoclave above a superposition of cutouts with fibrous structure impregnated with a thermosetting organic material disposed between a lower mold and an upper sealing covering member, the space between the covering member and the mold being under vacuum. The atmosphere is nitrogen gas prepared from raw nitrogen by separation from air through permeation or adsorption, incorporating a residual content of oxygen between 0.5% and 6%, with a low content of water vapor. Application for example to the manufacture of secondary and primary structures in aeronautical and space construction.

7 Claims, 1 Drawing Sheet

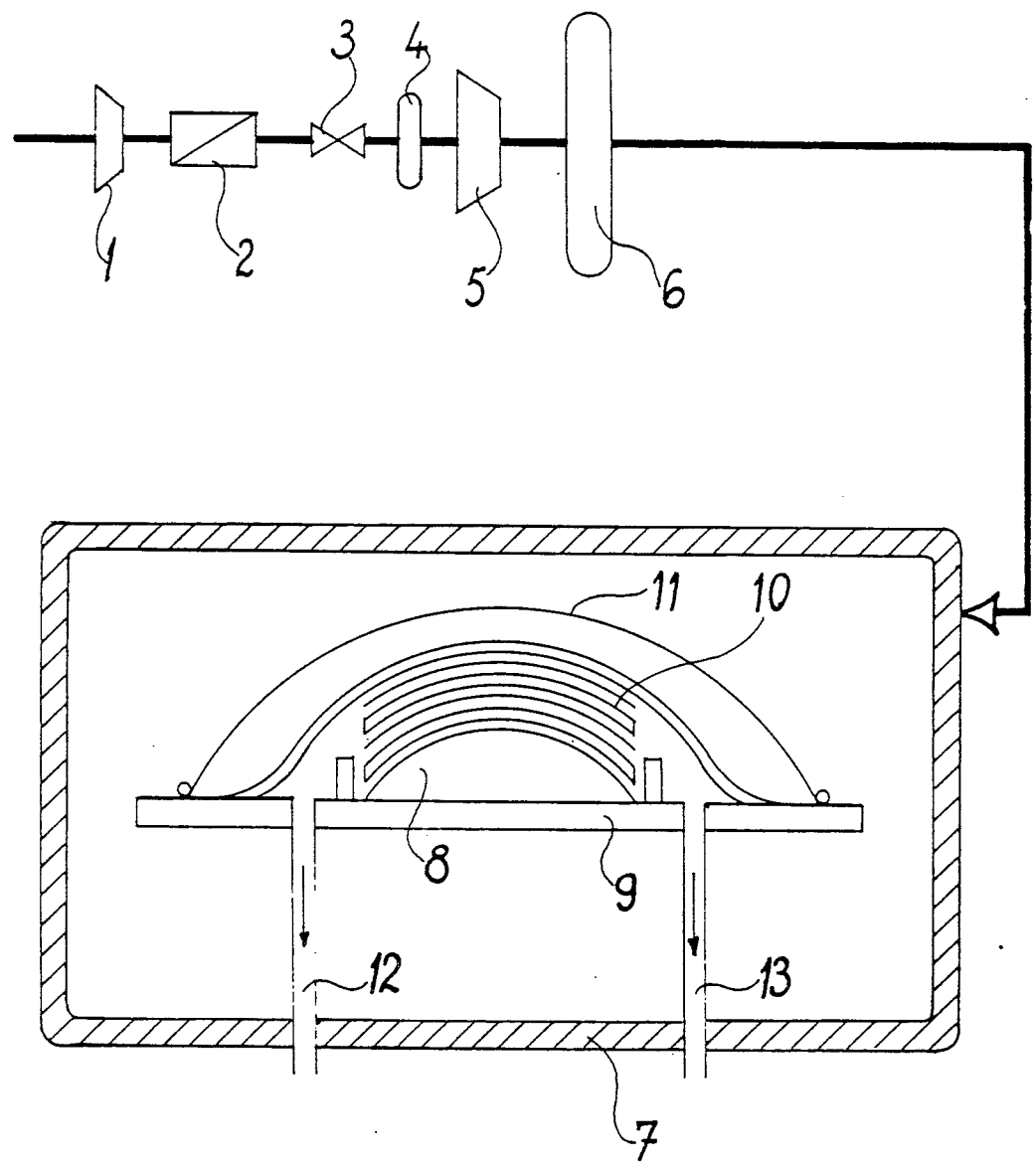

PROCESS FOR PRODUCING AN ATMOSPHERE FOR THE MANUFACTURE OF HIGH PERFORMING COMPOSITE ELEMENTS

BACKGROUND OF INVENTION (a) Field of the Invention

The present invention concerns the preparation of an atmosphere under pressure for the manufacture of so-called high performance composite parts of the type wherein said atmosphere is used in an autoclave above a superposition of tissue cutouts with fibrous structure impregnated with a thermosetting organic material disposed between a lower mold and upper sealing covering member, the space between the covering member and the mold being preferably under vacuum.

(b) Description of Prior Art

In practice, these elementary fibrous structures in the form of pre-impregnated textile cutouts are made from fibers which are reinforced with graphite carbon, aramide, glass, while the thermosetting organic materials are epoxy, polyester, phenolic, vinylester, polyimide resins.

Molding is carried out in an autoclave under relatively high temperature, of the order of 150° C. to 350° C. and under a pressure of the order of 5 bars to 20 bars depending on the nature of the organic material used, the vacuum surrounding the structure during molding being a primary vacuum, enabling to eliminate with the help of the pressure which is maintained above the covering member, any residual gaseous bubble in said structure, and any residual presence of organic solvent.

The atmosphere which is used to produce a pressure and which is also useful for thermic transfer, currently comprises air, since under the conditions of pressure and temperature, there is no risk of spontaneous ignition of the organic material, nor of any propagation of the flame. In spite of this relative safety, some accidents which lead to an ignition have been observed and the analysis which has been carried out has established that there is always a cause which is not directly connected to the structure during the molding. It may be a short in the accessory electrical equipment, or a defect in the preliminary drying of the solvents for the organic material, and the ignition, at the start, can have some effects on manufacturing accessories such as the covering member, the tissue and the impregnation carpet, the sealing compound, etc.

As long as this so-called autoclave molding process with a covering member under vacuum was used with small parts, such accidents could be controlled without too much damage, both with respect to material used and people associated with the process.

However, this technology has recently been broadened because parts whose dimensions increase more and more are actually manufactured according to this process and it is not rare to use autoclaves with capacities of many hundreds of cubic meters. And this dimensional development is also accompanied by increased productivity requirements for such heavy equipments and autoclaves. On the other hand, certain resins which are not currently used, such as polyimides, for example the one known under the commercial designation PMR 15, require conditions of higher pressure and temperature, therefore resulting in increased hazards. Moreover, and obviously for good reasons, safety rules concerning employees provide for norms which are increasingly demanding.

This is the reason why it has been proposed to replace the air making up the atmosphere of the autoclave with inert nitrogen, but this represents a substantial increase of the investment (stocking of liquid nitrogen and evaporator, because of the large quantities of inert gas to be used in autoclaves of increasing sizes under increasingly higher pressures) and of the cost of utilization (since the liquid nitrogen obtained by cryogenic distillation is relatively expensive). Thus, to reach a compromise between cost and safety, a mixed solution was used wherein air is mixed with cryogenic nitrogen, while, however, remaining largely below the admissible theoretical value of the content of oxygen, but this solution has still proven to be expensive, and not very practical because of the requirements which are inherent in the technology of mixing gases.

The Applicant has undertaken a thorough study of the safety aspect of the composition of the atmospheres which can be used in this type of technology. Thus, the starting point was a maximum oxygen content (called oxygen index IO) which prevents the propagation of a flame after local ignition on a product in contact with said atmosphere, and if the real oxygen content is lower than IO, then the atmosphere qualifies as a security atmosphere for the product in question. The method used consisted in determining the oxygen index IO at a temperature TO of 25° C. and a pressure PO of 1 bar and to proceed to an extrapolation by corrective calculation for higher pressures and temperatures (it should be noted that the correction of the pressure is in fact completely negligible). And, the experimental observation was to the effect that notwithstanding the type of polymer, the oxygen index IO, at 25° C. under 1 bar, is always higher than 0.15. The result of this study is given herebelow:

| T | IO (1 bar) | IO (30 bars) |
| --- | --- | --- |
| 25° C. | 0.15 | |
| 100° C. | 0.107 | 0.101 |
| 150° C. | 0.088 | 0.084 |
| 180° C. | 0.080 | 0.075 |
| 230° C. | 0.068 | 0.064 |
| 315° C. | 0.054 | 0.051 |
| 450° C. | 0.039 | 0.0377 |

From a reading of these results, it will be observed that in the case of epoxy resins heated at at temperature of 180° C., the oxygen index IO is 0.080 (1 bar), 0.075 (30 bars), while it decreases to 0.054 (1 bar), 0.051 (30 bars) at a temperature of 315° C., which is the one used with polyimides.

These figures should be compared with the oxygen indices measured in an atmosphere in contact with various materials of accessory devices which can be used in a molding operation in an autoclave under a covering member under vacuum. As previously, this oxygen index corresponds to the minimum content of oxygen in a mixture of oxygen and nitrogen under atmospheric pressure at which propagation of the combustion of the material takes place naturally:

-molding operation at a temperature of the order of 120° C. to 180° C.

| (polymerization of epoxy resins) | | |
| --- | --- | --- |
| | Ref. TYGAVAC | IO |
| Covering member under vacuum | NBF 205C 50μ | 0.43 |
| Unmolding film | RF 260 25μ | 0.90 |
| Draining carpet | NW 339HA | 0.24 |
| Unlaminating tissue | 80 A/R | 0.19 |
| Unmolding film | RF 239 | 0.27 |

-molding operation at a temperature of the order of 300° C.

| (polymerization of polyimides/PMR 15) | | |
| --- | --- | --- |
| | Ref. TYGAVAC | IO |
| Covering member under vacuum | PBF 400 50μ | 0.39 |
| Unmolding film | RF 305 25μ | 0.99 |
| Draining carpet | NW 450HU | 0.82 |
| Unlaminating tissue | 300 C/R | 1 |
| Sealing compound | VRS 600 | 0.20 |

The Applicant has then set up a margin of safety by proposing to limit the oxygen content to 80% of the oxygen index IO and has then concluded that an atmosphere in the presence of an epoxy resin at 180° C. should have an oxygen content lower than 0.06 (6% oxygen), an atmosphere in the presence of phenolic resin at 230° C. should have an oxygen content lower than 0.045 (4.5% of oxygen) and an atmosphere of polyimide resin at a temperature of 310° C. should have an oxygen content lower than 0.040 (oxygen content lower than 4%).

Once these results were confirmed by experimentation, the Applicant tried to solve all these safety operating conditions as cheaply as possible. In this context, it should be noted that the problem to be solved included a priori the obligation to find a source of gas, in which the production cost was clearly lower than cryogenic distillation nitrogen, enabling in a simple manner without requiring expensive means to go from a safety atmosphere for a type of resin to another safety atmosphere for another type of resin, since many thermosetting resins with different ignition properties may be used in succession in the same treating installation. A solution, of course, would have been to select the safety atmosphere for the resin which is more highly inflammable (i.e. as was shown in the case of polyimide resin), but this would have led to totally inadmissible treatment costs for the less inflammable resins.

SUMMARY OF INVENTION

From these considerations, the Applicant has reached the present invention, according to which a security atmospheric gas is prepared from raw nitrogen obtained by separation from air through permeation or adsorption with a residual content of oxygen which can be adjusted between 0.1% and 15% and preferably between 0.1% and 6%, the water vapor content ranging up to 10 ppm.

It is therefore the value of the present invention to have determined, for each type of resin used, the oxygen indices corresponding to the inflammatory limits and to have selected, among the possibilities which are offered to realize such safety atmospheres, the only two which enable to produce at low cost raw nitrogen obtained by separation from air with a residual oxygen content lower than 6% while permitting, through particularly simple means, to adjustably lower this residual content to values lower than 6% and even as low as 0.1%. Indeed, the simplicity of the adjustment enables to use a permeator or an adsorber without any particular problem, since it is necessary only to limit the production flow while maintaining the same flow of introduced air, and this, under conditions of totally acceptable production cost, while accepting, for reasons of feasibility of exploitation, a residual oxygen content which is near the maximum authorized limit. But such an optimum adjustment must absolutely be made case by case, because it should be accepted that the reduction of the residual oxygen content (between 6% and 0.1%) is carried out to the detriment of the rate of extraction and consequently with an increase of the production cost and in this connection it should be observed that the rate of extraction (volume of production of raw nitrogen per unit of volume air introduced) decreases considerably with the decrease of the oxygen content. It is therefore a decisive advantage, for a given autoclave, or a series of autoclaves mounted in parallel, to rely on a single unit for producing the raw nitrogen intended to constitute the safety atmosphere, which can be used without any difficulty, successively and after adjustment, for the molding of elements impregnated with different resins.

This has the advantages of preventing, in principle, any ignition of the materials placed in the autoclave and in the case of the accidental start of an ignition of external origin, the materials are self-extinguishing, since the speed of propagation of the flame is therefore equal to zero. In addition to the fact already mentioned of the optimum adjustment of the oxygen content, it should be mentioned that this process according to the invention uses an inert atmosphere which is consequently not harmful.

Equipment for preparing an atmosphere for the manufacture of high performance composite parts, of the type wherein said atmosphere is used in an autoclave above a superposition of textile cutouts with fibrous structure impregnated with a thermosetting organic material disposed in an autoclave between a lower mold and an upper sealing covering member, with means to place the space between the covering member and the mold under vacuum, and means for injecting a substantially inert gas under pressure, is characterized in that it comprises an air compressor for feeding a device for producing raw nitrogen by separation from air, of the adsorber or permeator type, means to adjust the pressure downstream of said generator, a second compressor or over-pressure generator and a buffer tank intended to be connected to said autoclave.

By way of examples, the following atmospheres have been tested:

-case of an epoxy resin: nitrogen with a residual oxygen content of 3%, 4%, 5% and 6% was used and nothing happened following the start of an ignition;

-case of a polyimide resin: nitrogen with a residual oxygen content of 0.5%, 1%, 2% and 4% with the same satisfactory results.

BRIEF DESCRIPTION OF DRAWINGS

The single FIGURE is a schematic representation of equipment suitable for the preparation of an atmosphere for the manufacture of high performance composite parts.

DESCRIPTION OF PREFERRED EMBODIMENTS

Equipment suitable for the practice of the process according to the invention adapted to an already existing equipment operating under air pressure is shown in the annexed schematical drawing, wherein it will be seen that an air compressor 1 feeds a membrane generator or adsorber 2, followed by an expansion valve 3. The raw nitrogen produced under a pressure of the order of 8 bars passes to a small buffer tank 4 and is then sent towards compressor 5 for feeding a main buffer tank 6, from which a sample is taken of the safety raw nitrogen for an autoclave 7.

In the autoclave 7, on a lower mold 8 placed on a support 9, there were disposed a superposition of textile cutouts with a structure pre-impregnated with resin 10, above which there was placed a covering member 11 which is sealingly fixed at its periphery by means of compound joints in order to produce, through ducts 12 and 13, a primary vacuum by means of pumps not represented.

As a variant, in the case of a new autoclave equipment, it is then useless to expand the gas at the outlet of the adsorber or permeator and it is sufficient merely to recover this production gas under pressure by means of an over pressure device instead of a simple compressor.

The invention is applicable to the field of so-called high performance composite parts which concern secondary structures and even primary structures for aeronautical and space constructions such as aerofoils, fuselages, empennages, wing edges, boxes for aerofoils, and wing tips. In addition, the invention can be used for the manufacture of multilayer printed circuits, having copper sheet induced tracks or copper inductors formed by serigraphy.

We claim:

1. A method of manufacturing a shaped composite part comprising the following steps:

a) superimposing on a lower mold structure in an autoclave a series of woven pieces impregnated with a thermosetting resin;
   b) a sealingly disposing on the superimposed series of pieces a flexible cover, thereby defining an inner volume containing the superimposed series of pieces;
   c) raising the temperature in the autoclave to a temperature between 120° C. and 350° C.;
   d) supplying air at a first pressure to an air separation unit;
   e) withdrawing from said air separation unit raw nitrogen having a content of oxygen comprised between 0.5% and 6% and a water vapor content not exceeding 10 ppm, at a second pressure between $5 \times 10^5$ and $20 \times 10^5$ Pa;
   f) and introducing the raw nitrogen at the second pressure into the autoclave but outside said inner volume to cause the composite part to compact and form a unitary shaped structure; and
   g) applying a vacuum, during at least part of step f), to said inner volume.

2. The method of claim 1, wherein the second pressure is not less than $\times 10^5$ Pa.

3. The method of claim 2, wherein the content of oxygen in the raw nitrogen is between 3 and 6%.

4. The method of claim 3, wherein the resin is an epoxy resin and the temperature is between 120° and 180° C.

5. The method of claim 3, wherein the resin is a phenolic resin and the temperature is about 230° C.

6. The method of claim 2, wherein the resin is a polyimid resin and wherein the oxygen content in the raw nitrogen is between 0.5 and 4%, the temperature being not less than 300° C.

7. The method of claim 1, wherein the air separation unit is a permeation unit having at least one permeation membrane.

* * * * *